US009240602B2

(12) United States Patent
Imanishi et al.

(10) Patent No.: US 9,240,602 B2
(45) Date of Patent: Jan. 19, 2016

(54) FUEL CELL SYSTEM

(75) Inventors: Hiroyuki Imanishi, Toyota (JP); Kota Manabe, Toyota (JP); Tomoya Ogawa, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 866 days.

(21) Appl. No.: 12/743,911

(22) PCT Filed: Nov. 11, 2008

(86) PCT No.: PCT/JP2008/070485
§ 371 (c)(1),
(2), (4) Date: May 20, 2010

(87) PCT Pub. No.: WO2009/066585
PCT Pub. Date: May 28, 2009

(65) Prior Publication Data
US 2010/0291447 A1 Nov. 18, 2010

(30) Foreign Application Priority Data
Nov. 21, 2007 (JP) ................................. 2007-301232

(51) Int. Cl.
*H01M 8/04* (2006.01)
*B60L 11/18* (2006.01)

(52) U.S. Cl.
CPC ....... *H01M 8/04559* (2013.01); *B60L 11/1894* (2013.01); *H01M 8/0488* (2013.01);
(Continued)

(58) Field of Classification Search
CPC .......... B60L 11/1894; B60L 2240/545; B60L 2240/547; H01M 8/04268; H01M 8/04559; H01M 8/0488; Y02E 60/50; Y02T 90/34

USPC .................................................. 429/428–451
See application file for complete search history.

(56) References Cited

U.S. PATENT DOCUMENTS

2005/0048335 A1* 3/2005 Fields et al. ..................... 429/22
2008/0081224 A1* 4/2008 Burch et al. ..................... 429/13
(Continued)

FOREIGN PATENT DOCUMENTS

CA  WO 0103215 A1 *  6/1999  .............. H01M 8/04
JP        09-231991 A        9/1997
(Continued)

OTHER PUBLICATIONS

The Control Handbook, ed. Levine, CRC Press (1996) Chapter 10.5 PID Control or Chapter 20.3 Linearization and Gain Scheduling, p.*
(Continued)

*Primary Examiner* — Milton I Cano
*Assistant Examiner* — Ling R Zeng
(74) *Attorney, Agent, or Firm* — Kenyon & Kenyon LLP

(57) ABSTRACT

Provided is a fuel cell system capable of supplying electric power to external loads without excess or deficiency even when switching occurs between operation states. A warm-up timing judgment part judges whether it is time to operate warm-up based on the temperature of a fuel cell stack. A target shift voltage determination part determines a target output voltage of the fuel cell stack used during a warm-up operation, and a voltage change speed determination part determines a voltage change speed based on electric power required from the fuel cell stack, the target output voltage of the fuel cell stack used during the warm-up operation which is output from the target shift voltage determination part and a current output voltage detected by a voltage sensor. A voltage decrease execution part operates voltage decrease processing according to the voltage change speed indicated by the voltage change speed determination part.

7 Claims, 7 Drawing Sheets

(52) U.S. Cl.
CPC ...... *H01M8/04268* (2013.01); *B60L 2240/545* (2013.01); *B60L 2240/547* (2013.01); *Y02E 60/50* (2013.01); *Y02T 90/34* (2013.01)

(56) References Cited

U.S. PATENT DOCUMENTS

| | | | |
|---|---|---|---|
| 2008/0102326 A1* | 5/2008 | Falta | 429/13 |
| 2008/0299428 A1* | 12/2008 | Miyata et al. | 429/24 |
| 2009/0011301 A1* | 1/2009 | Matsumoto et al. | 429/23 |
| 2009/0148736 A1* | 6/2009 | Manabe et al. | 429/23 |
| 2009/0287320 A1* | 11/2009 | MacGregor et al. | 700/29 |

FOREIGN PATENT DOCUMENTS

| | | | |
|---|---|---|---|
| JP | 2001-357865 A | | 12/2001 |
| JP | 2002-313388 A | | 10/2002 |
| JP | 2004-030979 A | | 1/2004 |
| JP | 2004-146114 A | | 5/2004 |
| JP | 2004-281219 A | | 10/2004 |
| JP | 2004-296338 A | | 10/2004 |
| JP | 2007-026933 A | | 2/2007 |
| JP | 2007026933 A | * | 2/2007 |
| JP | 2007-149595 A | | 6/2007 |
| JP | 2007-157478 A | | 6/2007 |
| JP | 2007-188826 A | | 7/2007 |
| JP | 2007-226987 A | | 9/2007 |

OTHER PUBLICATIONS

A new dynamic model for predicting transientphenomena in PEM fuel cell system, Pathapati and Tang, Renewable Energy 30 (2005) 1-22.*
Steady state and dynamic performance of proton exchange membrane fuel cells (PEMFCs) under various operating conditions and load changes, Yan, Toghiani and Causey, Journal of Power Sources 161 (2006) 492-502.*
Transient analysis of polymer electrolyte fuel cells, Wang and Wang, Electrochimica Acta 50 (2005) 1307-1315.*
Dynamic characteristics of PEM fuel cells, Wingelaar Duarte and Hendrix, 36th IEEE Power Electronics Specialists Conference (Jun. 2005) 1635-1642.*
Dynamic models and model validation for PEM fuel cells using electrical circuits, Wang, Nehirir, and Shaw, IEEE Transactions on Energy Conversion 20 (Jun. 2005) 442-451.*
Tanaka, machine translation of JP2007-026933.*

* cited by examiner

FUEL CELL SYSTEM

This is a 371 national phase application of PCT/JP2008/070485 filed 11 Nov. 2008, which claims priority to Japanese Patent Application No. 2007-301232 filed 21 Nov. 2007, the contents of which are incorporated herein by reference.

FIELD OF THE INVENTION

The invention relates generally to a fuel cell system, and particularly to a fuel cell system which warms up a fuel cell by a low-efficiency operation.

BACKGROUND OF THE INVENTION

A fuel cell is a power generation system which oxidizes a fuel through an electrochemical process and directly converts an energy released as a result of the oxidation reaction to an electric energy. The fuel cell has a stack structure which has a plurality of membrane-electrode assemblies stacked therein, the membrane-electrode assemblies each being configured from: an electrolyte membrane which selectively transports hydrogen ions; and a pair of electrodes which are made of porous materials and which sandwich both surfaces of the electrolyte membrane. Among fuel cells of this type, it has been expected, in particular, that a solid polymer electrolyte fuel cell which uses a solid polymer membrane as an electrolyte will be used as an in-vehicle power source due to its low cost, ease of downsizing, and high power density.

In general, the optimum temperature range for a fuel cell of this type to generate electric power is considered to be 70 to 80° C. However, in cold regions or similar environments, where it often takes a long time to reach the optimum temperature range after starting the fuel cell, various types of warm-up systems have been studied. For example, patent document 1 below discloses a technique for warming up a fuel cell while allowing a vehicle to travel by carrying out a low-efficiency operation with a lower power generation efficiency as compared to a normal operation and thereby controlling the amount of self-heat generation of the fuel cell. In such a technique, since the output voltage of the fuel cell is set to a voltage value lower than a voltage value obtained based on its current-voltage characteristics (hereinafter referred to as the "I-V characteristics") to increase heat loss of the fuel cell and a warm-up operation is carried out through self-heat generation, the technique does not need installation of a warm-up system and thus is very convenient.

Patent document 1: Japanese laid-open patent publication No. 2002-313388

DISCLOSURE OF THE INVENTION

Problem to be Solved by the Invention

The I-V characteristics of a fuel cell are not constant and greatly vary in accordance with the operation state of the fuel cell (e.g., when the operation state is switched from a normal operation to a low-efficient operation). If the output power of the fuel cell is controlled without taking such variation into account, problems might arise where electric power to be supplied to external loads (a traction motor, various types of auxiliary apparatuses, a secondary cell, etc.) would become insufficient or excessive.

The present invention has been made in light of the above circumstances, and it is an object of the present invention to provide a fuel cell system capable of supplying electric power to external loads without excess or deficiency even when switching between operation states, etc. is carried out.

Means for Solving the Problem

In order to solve the problem above, provided according to the present invention is a fuel cell system which warms up a fuel cell by carrying out a low-efficiency operation with a power generation efficiency lower than that of a normal operation, the fuel cell system comprising: a judgment unit which judges whether or not it is time to start warm-up of the fuel cell; a setting unit which sets a target warm-up voltage of the fuel cell; a detection unit which detects a current output voltage of the fuel cell; a determination unit which determines, when it is determined that it is time to start the fuel cell, a voltage change speed of the output voltage based on required electric power, the detected output voltage and the target warm-up voltage; and a control unit which shifts the output voltage to the target warm-up voltage at the determined voltage change speed.

With such a configuration, when it is time to start the warm-up of the fuel cell, a voltage change speed is determined based on electric power required from the fuel cell, etc., a target voltage of the fuel cell during the warm-up operation, and a current output voltage, and the output voltage of the fuel cell stack is shifted (changed) to the target output voltage at the determined voltage change speed.

A current which can be extracted from a fuel cell changes in accordance with the voltage change speed of the output voltage of the fuel cell, and the higher the voltage change speed is, the larger the amount of momentary change in the output current becomes (see FIG. 3) Accordingly, the fuel cell can be rapidly warmed up while supplying the required amount of electric power by controlling the output current in such a manner that the voltage change speed of the output voltage of the fuel cell is successively changed in accordance with electric power required from the fuel cell stack 20.

In the configuration above, it is preferable that: the fuel cell system further comprises a temperature detection unit which detects a fuel cell related temperature; and the judgment unit determines whether or not it is time to start the warm-up of the fuel cell based on the related temperature.

In the configuration above, it is preferable that the setting unit changes the target warm-up voltage in accordance with at least the related temperature or the electric power required from the system.

In the configuration above, it is preferable that the detection unit detects current output voltages more than once at arbitrary points in time until the output voltage is shifted to the target warm-up voltage; and the determination unit determines the voltage change speed of the output voltage based on electric power required from the system, the detected output voltage and the target warm-up voltage every time a detection occurs.

In the configuration above, it is preferable that: the fuel cell system further comprises a threshold value setting unit which sets a voltage threshold value larger than the target warm-up voltage; and the control unit shifts, when the output voltage falls below the voltage threshold value, the output voltage to the target warm-up voltage at a voltage speed higher than the voltage change speed at the point in time when the output voltage falls below the voltage threshold value.

In the configuration above, it is preferable that: the fuel cell system further comprises a count unit which counts time elapsed from when the shift of the output voltage is started; and the determination unit shifts, when the output voltage falls below the voltage threshold value and the elapsed time exceeds a time threshold value, the output voltage to the target warm-up voltage at a voltage change sped higher than the voltage change speed at the point in time when the output voltage falls below the voltage threshold value and the elapsed time exceeds a time threshold value.

Effect of the Invention

As described above, the present invention enables electric power to be supplied to external loads without excess or deficiency even when switching between operation states, etc. is carried out.

BEST MODE FOR CARRYING OUT THE INVENTION

Embodiments of the present invention will be described below with reference to the attached drawings.

A. First Embodiment

A-1. Configuration

FIG. 1 schematically shows the configuration of a vehicle equipped with a fuel cell system 10 according to this embodiment. Although the following description assumes a fuel cell hybrid vehicle (FCHV) as an example of vehicles, the fuel cell system may also be applied to electric vehicles and hybrid vehicles. In addition, the fuel cell system may be applied not only to the vehicles but also to various mobile objects (e.g., ships, airplanes and robots), stationary power supplies and mobile fuel cell systems.

The fuel cell system 10 functions as an in-vehicle power supply system which is installed in a fuel cell vehicle, the fuel cell system 10 including: a fuel cell stack 20 which is supplied with reactant gases (a fuel gas and an oxidant gas) and generates electric power; an oxidant gas supply system 30 which supplies the air serving as the oxidant gas to the fuel cell stack 20; a fuel gas supply system 40 which supplies a hydrogen gas serving as the fuel gas to the fuel cell stack 20; a power system 50 which controls charge and discharge of electric power; a cooling system 60 which cools the fuel cell stack 20; and a controller (ECU) 70 which controls the entire system.

The fuel cell stack 20 is a solid polymer electrolyte type cell stack in which a plurality of cells are stacked in series. In the fuel cell stack 20, an oxidation reaction in formula (1) occurs in an anode and a reduction reaction in formula (2) occurs in a cathode. An electrogenic reaction in formula (3) occurs in the fuel cell stack 20 as a whole.

$$H_2 \rightarrow 2H^+ + 2e^- \quad (1)$$

$$(½)O_2 + 2H^+ + 2e^- \rightarrow H_2O \quad (2)$$

$$H_2 + (½)O_2 \rightarrow H_2O \quad (3)$$

The fuel cell stack 20 is provided with: a voltage sensor 71 which detects an output voltage of the fuel cell stack 20; and a current sensor 72 which detects a power generation current.

The oxidant gas supply system 30 includes: an oxidant gas path 34 in which the oxidant gas to be supplied to the cathode in the fuel cell stack 20 flows; and an oxidant-off gas path 36 in which an oxidant-off gas discharged from the fuel cell stack 20 flows. The oxidant gas path 34 is provided with: an air compressor 32 which introduces the oxidant gas from the atmosphere via a filter 31; a humidifier 33 which humidifies the oxidant gas to be supplied to the cathode in the fuel cell stack 20; and a throttle valve 35 which regulates the amount of supply of the oxidant gas. The oxidant-off gas path 36 is provided with: a backpressure regulating valve 37 which regulates the supply pressure of the oxidant gas; and a humidifier 33 which exchanges moisture between the oxidant gas (dry gas) and the oxidant-off gas (wet gas).

The fuel gas supply system 40 includes: a fuel gas supply source 41; a fuel gas path 45 in which the fuel gas to be supplied from the fuel gas supply source 41 to the anode in the fuel cell stack 20 flows; a circulation path 46 which returns the fuel-off gas discharged from the fuel cell stack 20 to the fuel gas path 45; a circulation pump 47 which pumps the fuel-off gas in the circulation path 46 toward the fuel gas path 43; and an exhaust/drain path 48 which branches from the circulation path 47.

The fuel gas supply source 41 is constituted from, for example, a high-pressure hydrogen tank, a hydrogen absorbing alloy, or the like, and stores a hydrogen gas at a high pressure (e.g., 35 MPa to 70 MPa). When opening a cutoff valve 42, the fuel gas flows from the fuel gas supply source 41 toward the fuel gas path 45. The pressure of the fuel gas is reduced to, for example, about 200 kPa by a regulator 43 and an injector 44, and then the fuel gas is supplied to the fuel cell stack 20.

Note that the fuel gas supply source 41 may be constituted from: a reformer which generates a hydrogen-enriched reformed gas from a hydrocarbon fuel; and a high-pressure gas tank which stores the reformed gas generated in the reformer in a high-pressure state.

The regulator 43 is an apparatus which regulates the pressure on the upstream thereof (primary pressure) to be a predetermined secondary pressure. The regulator 43 may be configured by, for example, a mechanical pressure reducing valve which reduces the primary pressure. The mechanical pressure reducing valve has a housing in which a backpressure chamber and a pressure regulating chamber are provided with a diaphragm interposed therebetween, and the primary pressure is reduced in the pressure regulating chamber using the backpressure in the backpressure chamber to a predetermined pressure which is the secondary pressure.

The injector 44 is an electromagnetically-driven on-off valve capable of regulating a gas flow rate or a gas pressure by directly driving a valve body with an electromagnetic driving force at a predetermined driving period so as to be isolated from a valve seat. The injector 44 includes: a valve seat having an injection hole which injects a gas fuel such as a fuel gas; a nozzle body which supplies and guides the gas fuel to the injection hole; and a valve body which is housed and held in the nozzle body so as to be moveable in an axial direction (a gas flow direction) of the nozzle body to open and close the injection hole.

The exhaust/drain path 48 is provided with an exhaust/drain valve 49. The exhaust/drain valve 49 operates in accordance with a command from the controller 70 and thereby discharges water and the fuel-off gas which contains impurities from the circulation path 46. By opening the exhaust/drain valve 49, the concentration of the impurities in the fuel-off gas within the circulation path 46 can be reduced and the hydrogen concentration of the fuel-off gas circulating through the circulation system can be increased.

The fuel-off gas discharged via the exhaust/drain valve 49 is mixed with the oxidant-off gas flowing in the oxidant-off gas path 34 and diluted in a diluter (not shown). The circulation pump 47 returns and supplies the fuel-off gas in the circulation system to the fuel cell stack 20 with the drive of a motor.

The power system 50 includes a DC/DC converter 51, a battery 52, a traction inverter 53, a traction motor 54 and auxiliary apparatuses 55. The DC/DC converter 51 has: a function of increasing a direct-current voltage supplied from the battery 52 and outputting the resulting voltage to the traction inverter 53; and a function of reducing the pressure of direct-current power generated by the fuel cell stack 20 or a regenerative power collected by the traction motor 54 as a result of regenerative braking and charging the battery 52 with the resulting power. These functions of the DC/DC converter 51 control charge and discharge of the battery 52. Also, due to the voltage conversion control by the DC/DC converter 51, an operating point (an output voltage and an output current) of the fuel cell stack 20 is controlled.

The battery 52 functions as: a storage source for excess electric power; a storage source for a regenerative energy during a regenerative braking operation; or an energy buffer for when load varies as a result of acceleration or deceleration of a fuel cell vehicle. Suitable examples of the battery 52 may include a secondary cell such as a nickel-cadmium battery, a nickel-hydrogen battery and a lithium battery.

The traction inverter 53 is, for example, a pulse width modulation-type (PWM) inverter, which converts a direct-current voltage output from the fuel cell stack 20 or the battery 52 to a three-phase alternating current voltage in accordance with a control command provided by the controller 70 and controls a rotation torque of the traction motor 54. The traction motor 54 is a motor (e.g., a three-phase alternating current motor) for driving wheels 56L and 56R and constitutes a power source of the fuel cell vehicle.

The auxiliary apparatuses 55 collectively refer to various motors provided in the fuel cell system 10 (e.g., power sources for the pumps), inverters for driving these motors, various types of in-vehicle auxiliary apparatuses (e.g., an air compressor, an injector, a cooling-water circulation pump, a radiator, etc.).

The cooling system 60 includes: coolant paths 61, 62, 63 and 64 in which a coolant circulating inside the fuel cell stack 20 flows; a circulation pump 65 which pumps the coolant; a radiator 66 which exchanges heat between the coolant and the external air; a three-way valve 67 which switches the circulation path for the coolant; and a temperature sensor 74 which detects the temperature of the coolant. During a normal operation after the completion of a warm-up operation, the three-way valve 67 is controlled to open or close so that the coolant which has flown out from the fuel cell stack 20 flows in the coolant paths 61 and 64 and is cooled by the radiator 66 and then flows in the coolant path 64 and flows again into the fuel cell stack 20. On the other hand, during the warm-up operation immediately after the system is started, the three-way valve 67 is controlled to open or close so that the coolant which has flown out from the fuel cell stack 20 flows in the coolant paths 61, 62 and 64 and flows again into the fuel cell stack 20.

The controller 70 is a computer system which includes a CPU, a ROM, a RAM, input/output interfaces and the like, the controller 70 serving as a control means for controlling the components (the oxidant gas supply system 30, the fuel gas supply system 40, the power system 50 and the cooling system 60) in the fuel cell system 10. For example, when receiving a start signal IG output from an ignition switch, the controller 70 starts the operation of the fuel cell system 10 and obtains an electric power required from the entire system based on an accelerator opening degree signal ACC output from an accelerator sensor and a vehicle speed signal VC output from a vehicle speed sensor.

The electric power required from the entire system is the sum of the amount of electric power required for the vehicle travel and the amount of electric power for auxiliary apparatuses. The electric power for auxiliary apparatuses includes electric power consumed by the in-vehicle auxiliary apparatuses (the humidifier, the air compressor, the hydrogen pump and the cooling-water circulation pump, etc.), electric power consumed by apparatuses which are required for the travel of the vehicle (a transmission, a wheel control apparatus, a steering gear, a suspension, etc.), electric power consumed by apparatuses provided in a passenger compartment (an air conditioner, lighting equipment, audio system, etc.), and the like.

The controller 70 determines the distribution ratio of electrical power output from the fuel cell stack 20 and electric power from the battery 52, computes a power generation command value, and controls the oxidant gas supply system 30 and the fuel gas supply system 40 so that the amount of electric power generated by the fuel cell stack 20 matches with target electric power (required electric power). The controller 70 further controls the DC/DC converter 51 to regulate the output voltage of the fuel cell stack 20 and thereby controls the operating point (the output voltage and the output current) of the fuel cell stack 20. The controller 70 outputs to the traction inverter 53 alternating current voltage command values of a U-phase, a V-phase and a W-phase, respectively, as switching commands to control the output torque and the number of revolutions of the traction motor 54.

C-V Characteristics of Fuel Cell Stack 20

The C-V characteristics (cyclic voltammogram) of the fuel cell stack 20 show dynamic electrical characteristics of the fuel cell stack 20, where when the voltage of the fuel cell stack 20 is increased at a certain rate, a current flows in a direction from the outside into the fuel cell stack 20 (a negative direction), while when the voltage of the fuel cell stack 20 is decreased at a certain rate, a current flows in a direction from the fuel cell stack 20 toward the outside (a positive direction). It is known that such dynamic electrical characteristics depend on: an electrical double layer capacitance component of a catalyst carrier in the fuel cell stack 20; and an apparent capacitance component resulting from an oxidation reduction reaction of the catalyst.

FIG. 2 is an equivalent circuit diagram showing modeled dynamic electrical characteristics of the fuel cell stack 20. The fuel cell stack 20 has a circuit structure in which an ideal fuel cell 28 and a capacitor 20 are connected in parallel. The ideal fuel cell 28 is a model of a virtual fuel cell which does not have the above-mentioned C-V characteristics, and behaves in a manner equivalent to a variable power source in terms of electrical characteristics. The capacitor 29 is a model of a capacitor element which represents an electrical behavior of an electrical double layer formed on a boundary surface. An external load 56 is an equivalent circuit obtained by modeling the power system 50. Assuming that a current flowing out from the ideal fuel cell 28 is represented as Ifc, an output voltage of the ideal fuel cell 28 (the output voltage of the fuel cell stack 20) is represented as Vfc, a current flowing into the capacitor 29 is represented as Ic, a current flowing out from the fuel cell stack 20 to an external load 56 is represented as Is, the capacitance of the capacitor 29 is represented as C, and time is represented as t, the following equations (4) and (5) can be established.

$$Ifc = Ic + Is \quad (4)$$

$$Ic = C \cdot \Delta Vfc / \Delta t \quad (5)$$

As shown in equations (4) and (5), when the output voltage Vfc is increased, the current Ic flowing into the capacitor 29 increases in accordance with the amount of change per unit time $\Delta Vfc/\Delta t$, and therefore the current Is flowing out from the fuel cell stack 20 to the external load 56 decreases. On the other hand, when the output voltage Vfc is decreased, the current Ic flowing into the capacitor 29 decreases in accordance with the amount of change per unit time ΔVfc/Δt, and therefore the current Is flowing out from the fuel cell stack 20 to the external load 56 increases. As described above, by controlling the amount of increase or decrease of the output voltage Vfc per unit time, the current Is flowing out from the fuel cell stack 20 to the external load 56 can be regulated (hereinafter referred to as the "ΔV control," for convenience of explanation).

In this embodiment, when the temperature of the stack is detected to be lower than a predetermined temperature (e.g., 0° C.) in a state where the operation of the vehicle is stopped (i.e., in a state where the vehicle is prepared to start before the travel of the vehicle; hereinafter referred to as the "start preparation state"), a low-efficiency operation is started (i.e., the operation state is switched from the start preparation state to the low-efficiency operation state) and a rapid warm-up for the fuel cell stack 20 is carried out.

The low-efficiency operation refers to an operation carried out with a low power-generation efficiency by reducing the amount of air supply as compared to a normal operation (e.g., setting an air stoichiometry ratio to 1.0) and thereby increasing power generation loss. When the low-efficiency operation is carried out with the air stoichiometry ratio being set to low, the concentration overvoltage becomes larger than that of the normal operation, and thus there is an increase in heat loss (power generation loss) in the energy that can be extracted from the reaction between hydrogen and oxygen.

Note that the low-efficiency operation is carried out not only before the travel of the vehicle (i.e., the operation state is switched from the start preparation state to the low-efficiency operation state) but also during the travel of the vehicle (i.e., the operation state is switched from the normal operation state to the low-efficiency operation state), in order to rapidly warm up the fuel cell stack 20 by intentionally increasing the heat loss in a low temperature environment. Note that the air stoichiometry ratio (i.e., oxygen excess ratio) during the low-efficiency operation is not intended to be limited to around 1.0, and it may be arbitrarily set or changed so as to be lower than an air stoichiometry ratio during the normal operation.

In this embodiment, when the operation state of the fuel cell stack 20 is shifted from the start preparation state to the low-efficiency operation state, the output voltage of the fuel cell stack is controlled so as to be changeable in accordance with required electric power while fixing the flow rate of the oxidant gas to be supplied to the fuel cell stack 20 at a constant value. As shown in equations (4) and (5), when the output voltage of the fuel cell stack 20 is changed, charge or discharge of electrical power from the capacitor 29 occurs due to the capacitance characteristics of the fuel cell stack 20, and electric power (i.e., output power) supplied from the fuel cell stack 20 to the external load 56 is changed.

FIG. 3 is a diagram showing the I-V characteristics of the fuel cell stack 20 in the state where the operation state is shifted, where I-V characteristics with voltage change speed Sch1=25V/s are shown by the solid line, while I-V characteristics with voltage change speed Sch2=50V/s are shown by the alternate long and short dash line. Note that the I-V characteristics shown in FIG. 3 assume the condition in which the amount of oxidant gas to be supplied to the fuel cell stack 20 is controlled to be constant.

As shown in FIG. 3, an area A1 (specifically, a catalyst reduction area) exists where an output current greatly changes when the output voltage of the fuel cell stack 20 is decreased in the situation where the operation state of the fuel cell stack 20 is shifted from the start preparation state to the low-efficiency operation state. A current which can be extracted from the fuel cell stack 20 in the catalyst reduction area A1 (i.e., an output current) changes in accordance with the voltage change speed of the output voltage of the fuel cell stack 20, and the higher the voltage change speed is, the larger the amount of momentary change in the output current becomes as shown in FIG. 3 (see the voltage change speeds Sch1 and Sch2 shown in FIG. 3). As is well known, since the output power of the fuel cell stack 20 can be calculated by multiplying the output current by the output voltage, a desired output power can be obtained by controlling the output current in such a manner that the voltage change speed of the output voltage of the fuel cell stack 20 is successively changed in accordance with electric power required from the fuel cell stack 20.

FIG. 4 is a functional block diagram of the controller 70 which carries out warm-up control processing.

The controller 70 includes a warm-up timing judgment part 70a, a target shift voltage determination part 70b, a voltage change speed determination part 70c and a voltage decrease execution part 70d.

The warm-up timing judgment part (judgment unit) 70a judges whether it is time to carry out the warm-up based on the temperature of the fuel cell stack 20 (FC temperature) detected by the temperature sensor 74. Note that the environmental temperature around the fuel cell stack 20 or the temperature of a component around the fuel cell stack 20 (fuel cell-related temperatures) may be detected instead of the FC temperature. The warm-up timing judgment part 70a has an FC temperature threshold value (e.g., 0° C.) which has been set so as to be used in judgments of whether or not the warm-up operation should be started. When receiving a detected FC temperature from the temperature sensor 74, the warm-up timing judgment part 70a compares this FC temperature with the FC temperature threshold value. When determining that the FC temperature is below the FC temperature threshold value, the warm-up timing judgment part 70a outputs to the target shift voltage determination part 70b and the voltage change speed determination part 70c a notice providing notification that it is time to start the warm-up operation using the low-efficiency operation.

In accordance with the notice from the warm-up timing judgment part 70a, the target shift voltage determination part 70b determines a target output voltage Vo1 of the fuel cell stack 20 used during the warm-up operation (i.e., a target shift voltage of the fuel cell stack 20 obtained when the operation state is shifted from the start preparation state to the low-efficiency operation state; see FIG. 4) based on the electric power required from the fuel cell stack 20, etc. When determining (setting) the target output voltage Vo1 of the fuel cell stack 20 used during the warm-up operation (target warm-up voltage), the target shift voltage determination part (setting unit) 70b outputs the determined voltage to the voltage change speed determination part 70c. Note that the target output voltage Vo1 of the fuel cell stack 20 used during the warm-up operation may be arbitrarily set in accordance with the FC temperature, the amount of heat generation or the electric power required from the fuel cell stack 20 or the like, or alternatively it may be a fixed value.

The voltage change speed determination part (determination unit) 70c determines, in accordance with the notice from the warm-up timing judgment part 70a, a voltage change speed (in this embodiment, a voltage decrease speed) based on the electric power required from the fuel cell stack 20, the target output voltage Vo1 of the fuel cell stack 20 used during the warm-up operation which is output from the target shift voltage determination part 70b, and a current output voltage detected by the voltage sensor (detection unit) 71 (for example, see Vp1 in FIG. 4). The 70c then notifies the voltage decrease execution part 70d of the determined voltage change speed.

As described above, when the operation state of the fuel cell stack 20 is shifted from the start preparation state to the low-efficiency operation state, desired output power can be obtained by changing the voltage change speed of the output voltage of the fuel cell stack 20. Accordingly, the voltage change speed determination part 70c determines, in order to obtain electric power which is required from the fuel cell stack 20, the voltage change speed based on the required electric power, the target output voltage Vo1 and the current output voltage. Note that the time for determining the voltage change speed may be arbitrary; it may be determined at a predetermined time interval (e.g., every 4 mS) in accordance with, for example, the time for detecting the output voltage with the voltage sensor (detection means), or the voltage change speed may alternatively be fixed after being determined once.

The voltage decrease execution part (control unit) 70d carries out, in accordance with the voltage change speed indicated by the voltage change speed determination part 70c, processing for decreasing the output voltage of the fuel cell stack 20 (hereinafter referred to as the "voltage decrease processing") so that required electric power can be obtained as desired. More specifically, the voltage decrease execution part 70d decreases the output voltage of the fuel cell stack 20 to the target output voltage using the DC/DC converter 51, based on the equations (6) and (7) below.

Current deviation=current command value−current measured value (6)

Voltage command value=voltage command value(previous value)−(current deviation*proportional gain+current deviation integral term*integral gain) (7)

At this time, the voltage decrease execution part 70d controls the voltage decrease operation of the DC/DC converter 51 so that the voltage change speed determined by the voltage change speed determination part 70c is maintained. With such a configuration, the fuel cell stack 20 can be rapidly warmed up while supplying the required electric power. When detecting that the FC temperature has increased to a preset normal operation switch temperature (e.g., 5° C.), the voltage decrease execution part 70d finishes warming up the fuel cell stack 20 and switches the operation state from the low-efficiency operation to the normal operation. The warm-up control processing will be described below with reference to FIG. 5.

A-2. Explanation of Operation

FIG. 5 is a flowchart showing the warm-up control processing carried out by the controller 70.

The warm-up timing judgment part 70a judges whether it is time to carry out the warm-up based on the temperature of the fuel cell stack 20 (FC temperature) detected by the temperature sensor 74. Specifically, the warm-up timing judgment part 70a compares the FC temperature detected by the temperature sensor 74 with the preset FC temperature threshold value and judges whether or not the FC temperature is below the FC temperature threshold value. When the FC temperature is equal to or higher than the FC temperature threshold value (step S100; NO), the warm-up timing judgment part 70a ends the processing without carrying out the steps below.

On the other hand, when determining that the FC temperature is below the FC temperature threshold value and thus it is time to carry out the warm-up (step S100; YES), the warm-up timing judgment part 70a outputs to the target shift voltage determination part 70b and the voltage change speed determination part 70c a notice providing notification that it is time to start the warm-up operation using the low-efficiency operation.

In accordance with the notice from the warm-up timing judgment part 70a, the target shift voltage determination part 70b determines a target output voltage Vo1 of the fuel cell 20 used during the warm-up operation (i.e., a target shift voltage of the fuel cell stack 20 obtained when the operation state is shifted from the start preparation state to the low-efficiency operation state; see FIG. 4) based on the electric power required from the fuel cell stack 20, etc. (step S200). When determining the target output voltage Vo1 of the fuel cell stack 20 used during the warm-up operation, the target shift voltage determination part 70b outputs the determined voltage to the voltage change speed determination part 70c.

The voltage change speed determination part 70c determines, in accordance with the notice from the warm-up timing judgment part 70a, a voltage change speed (in this embodiment, a voltage decrease speed) based on the electric power required from the fuel cell stack 20, the target output voltage Vo1 of the fuel cell stack 20 used during the warm-up operation which is output from the target shift voltage determination part 70b, and a current output voltage detected by the voltage sensor 71, and notifies the voltage decrease execution part 70d of the determined voltage change speed (step S300).

The voltage decrease execution part 70d carries out, in accordance with the voltage change speed indicated by the voltage change speed determination part 70c, the voltage decrease processing for the fuel cell stack 20 so that required electric power can be obtained as desired (step S400). More specifically, the voltage decrease execution part 70d decreases the output voltage of the fuel cell stack 20 to the target output voltage using the DC/DC converter 51, based on the equations (6) and (7) above. At this time, the voltage decrease execution part 70d controls the voltage decrease operation of the DC/DC converter 51 so that the voltage change speed determined by the voltage change speed determination part 70c is maintained. With such a configuration, the fuel cell stack 20 can be rapidly warmed up while supplying the required electric power. When detecting that the FC temperature has increased to a preset normal operation switch temperature (e.g., 5° C.), the voltage decrease execution part 70d ends the warm-up control processing described above and shifts the operation state from the low-efficiency operation to the normal operation.

As described above, in this embodiment, when the warm-up operation is carried out, the voltage change speed is determined based on the electric power required from the fuel cell stack, the target output voltage of the fuel cell stack used during the warm-up operation and the current output voltage, and changes the output voltage of the fuel cell stack to the target output voltage at the determined voltage change speed.

A current which can be extracted from a fuel cell stack changes in accordance with the voltage change speed of the output voltage of the fuel cell stack, and the higher the voltage change speed is, the larger the amount of momentary change in the output current becomes (see FIG. 4). Accordingly, the fuel cell stack can be rapidly warmed up while supplying the required output power by controlling the output current in such a manner that the voltage change speed of the output voltage of the fuel cell stack is successively changed in accordance with electric power required from the fuel cell stack.

B. Second Embodiment

FIG. 6 is a functional block diagram of a controller 70' which carries out warm-up control processing according to a second embodiment, and FIG. 6 corresponds to FIG. 4 above. Accordingly, like components are indicated with like reference numerals, and a detailed description thereof will be omitted.

In a voltage decrease execution part (threshold value setting unit) 70d', a shift-allowable voltage threshold value Va1 has been set (see FIG. 3). The shift-allowable voltage threshold value (voltage threshold value) Va1 is a threshold value used for judging whether or not the output voltage of the fuel cell stack 20 can be rapidly changed (in this embodiment, rapidly decreased), and is a value which is higher than the target output voltage. As shown in FIG. 3, in a voltage area which exceeds the shift-allowable voltage threshold value Va1, the output current greatly changes in accordance with changes in the output voltage of the fuel cell stack 20 (see the catalyst reduction area A1 in FIG. 3), while in a voltage area which is below the shift-allowable voltage threshold value Va1, the output current of the fuel cell stack 20 does not greatly change even when the output voltage is rapidly changed.

Based on such characteristics, in this embodiment, when the output voltage of the fuel cell stack 20 is equal to or higher than the shift-allowable voltage threshold value Va1, the output voltage of the fuel cell stack 20 is changed at a voltage change speed which has already been set (in this embodiment, a voltage change speed S1), while when the output voltage of the fuel cell stack 20 is below the shift-allowable voltage threshold value Va1, the output voltage of the fuel cell stack 20 is changed at a voltage change speed S2 which is higher than the voltage change speed which has already been set.

More specifically, the voltage decrease execution part (determination unit) 70d' compares a current output voltage detected by the voltage sensor 71 with the shift-allowable voltage threshold value Va1. When the current output voltage is equal to or higher than the shift-allowable voltage threshold value Va1, the voltage decrease execution part 70d' changes the output voltage of the fuel cell stack 20 using the voltage change speed determination part 70c at the voltage change speed S1 which has already been set. On the other hand, when detecting that the current output voltage is below the shift-allowable voltage threshold value Va1, the voltage decrease execution part 70d' changes the output voltage of the fuel cell stack 20 to the target output voltage at the voltage change speed S2 (>S1) which is higher than the voltage change speed S1 which has already been set. The voltage change speed S2 may be arbitrarily set; it may be a fixed value or it may be changed in a suitable manner.

C. Third Embodiment

FIG. 7 is a functional block diagram of a controller 70" which carries out warm-up control processing according to a third embodiment, and FIG. 7 corresponds to FIG. 6 above. Accordingly, like components are indicated with like reference numerals, and a detailed description thereof will be omitted.

A voltage decrease execution part 70d" is connected to a timer 70e. The timer (counting unit) 70e is a means for counting time from when the voltage decrease processing starts. In the voltage decrease execution part 70d", a processing time threshold value T1 has been set. The processing time threshold value T1 is a threshold value used for judging whether or not the output voltage of the fuel cell stack 20 can be rapidly changed (in this embodiment, rapidly decreased).

When the voltage decrease processing starts, the voltage decrease execution part 70d" starts to count time elapsed from when the voltage decrease processing starts (hereinafter referred to as the "voltage decrease processing time") using the timer 70e. When detecting that the current output voltage is below the shift-allowable voltage threshold value Va1, the voltage decrease execution part 70d" refers to the timer 70e to check voltage decrease processing time at the current time point.

When the voltage decrease processing time at the current time point, which has been counted by the timer 70e, is below the processing time threshold value T1, the voltage decrease execution part 70d" changes the output voltage of the fuel cell stack 20 at the voltage change speed S1 which has already been set. On the other hand, when detecting that the voltage decrease processing time exceeds the processing time threshold value T1, the voltage decrease execution part 70d" changes the output voltage of the fuel cell stack 20 to the target output voltage at the voltage change speed S2 (>S1) which is higher than the voltage change speed S1 which has already been set.

As described above, the voltage decrease execution part (determination unit) 70d" changes the output voltage of the fuel cell stack 20 to the target output voltage at the voltage change speed S2 (S1) which is higher than the voltage change speed S1 which has already been set when the current output voltage is below the shift-allowable voltage threshold value Va1 and the voltage decrease processing time at the current time point exceeds the processing time threshold value T1. The reason for carrying out such a control is that if a failure occurs in the current sensor 72, etc., and a current value larger than the actual current value is detected as a measured value (measured current value), the current deviation would become small as is obvious from equation (6) and the voltage command value obtained from equation (7) would be almost the same as the previous voltage command value, which would cause the output voltage of the fuel cell stack 20 to be maintained without decreasing.

In this embodiment, when the output voltage of the fuel cell stack 20 does not decrease to the target output voltage even though the voltage decrease processing time at the current time point exceeds the processing time threshold value T1, it is determined that some kind of failure or the like has occurred in the current sensor 72, etc., and the processing for decreasing the output voltage of the fuel cell stack 20 to the target output voltage is forcibly carried out. With such a configuration, even when a failure occurs in the current sensor 72, etc., the fuel cell stack 20 can be rapidly warmed up. Note that the processing time threshold value T1 may be arbitrarily set based on a normal time range which has been obtained in advance through experiments, etc., the normal time range being a range in which the output voltage of the fuel cell stack 20 can decrease to the target output voltage.

DESCRIPTION OF REFERENCE NUMERALS

Figure 1:
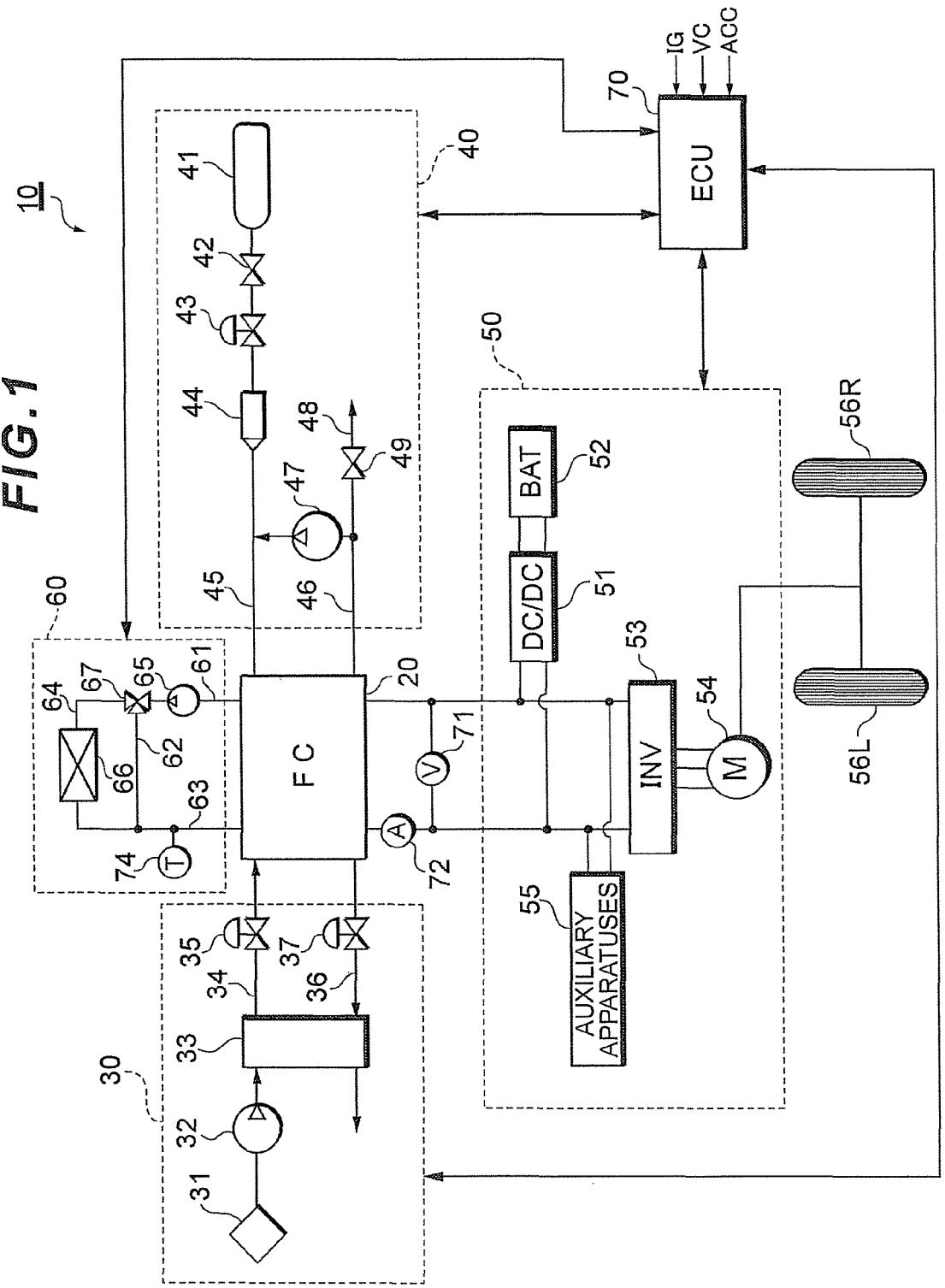
FIG. 1 is a diagram showing the configuration of a primary part of a fuel cell system according to a first embodiment.
Figure 2:
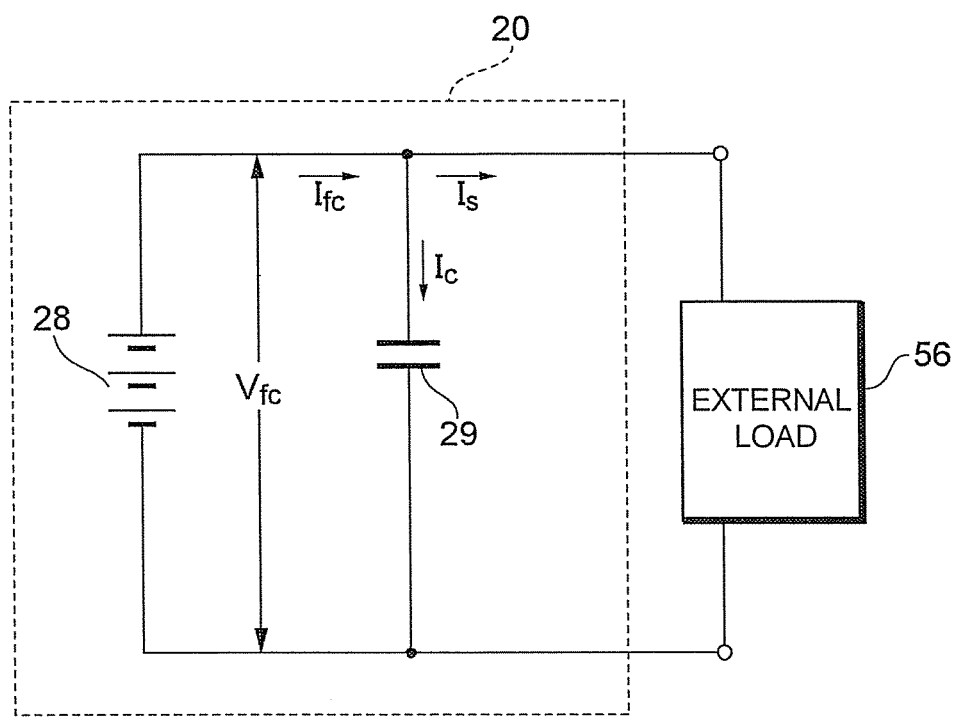
FIG. 2 is a diagram showing an equivalent circuit of the fuel cell system.
Figure 3:
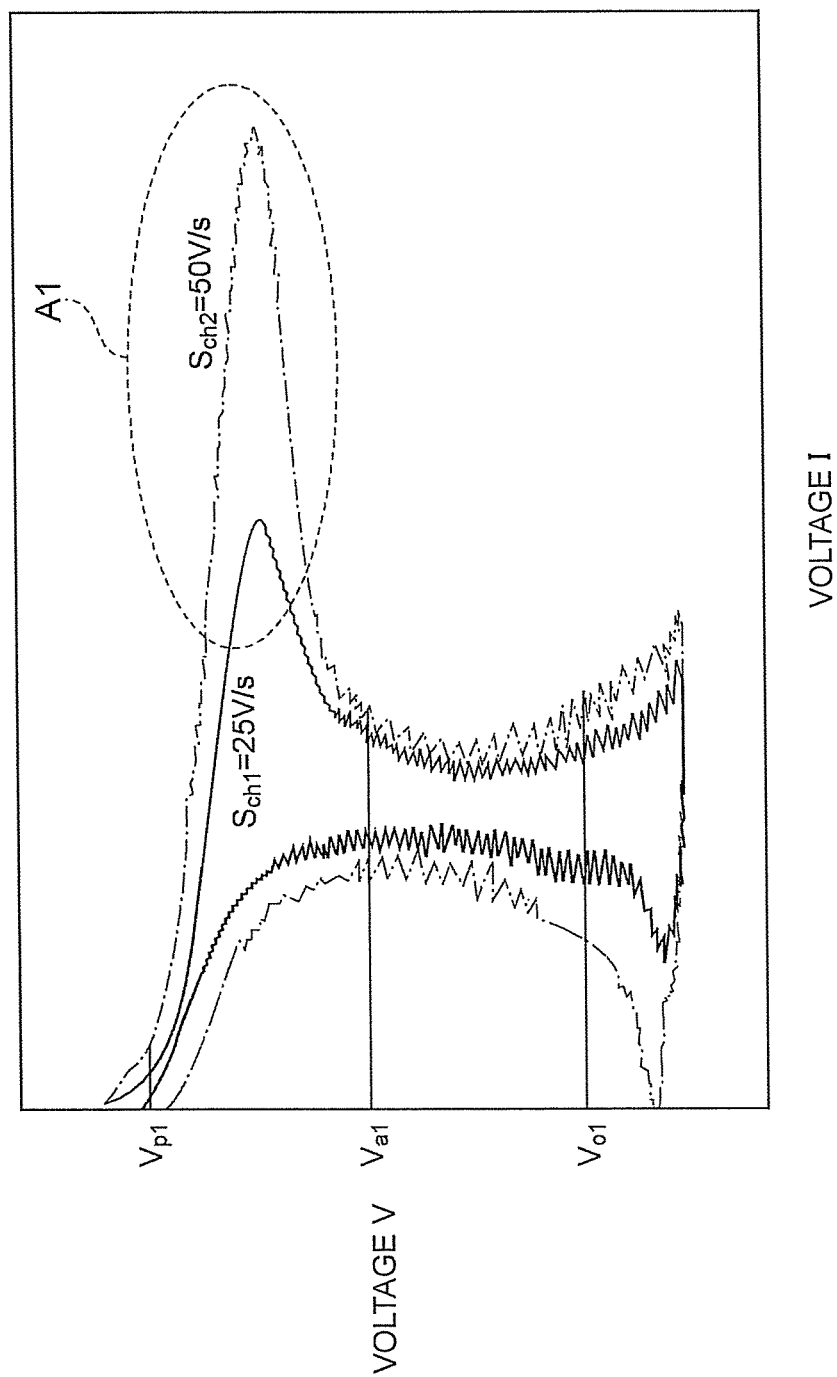
FIG. 3 is a diagram showing I-V characteristics of a fuel cell stack from when an operation state is shifted.
Figure 4:
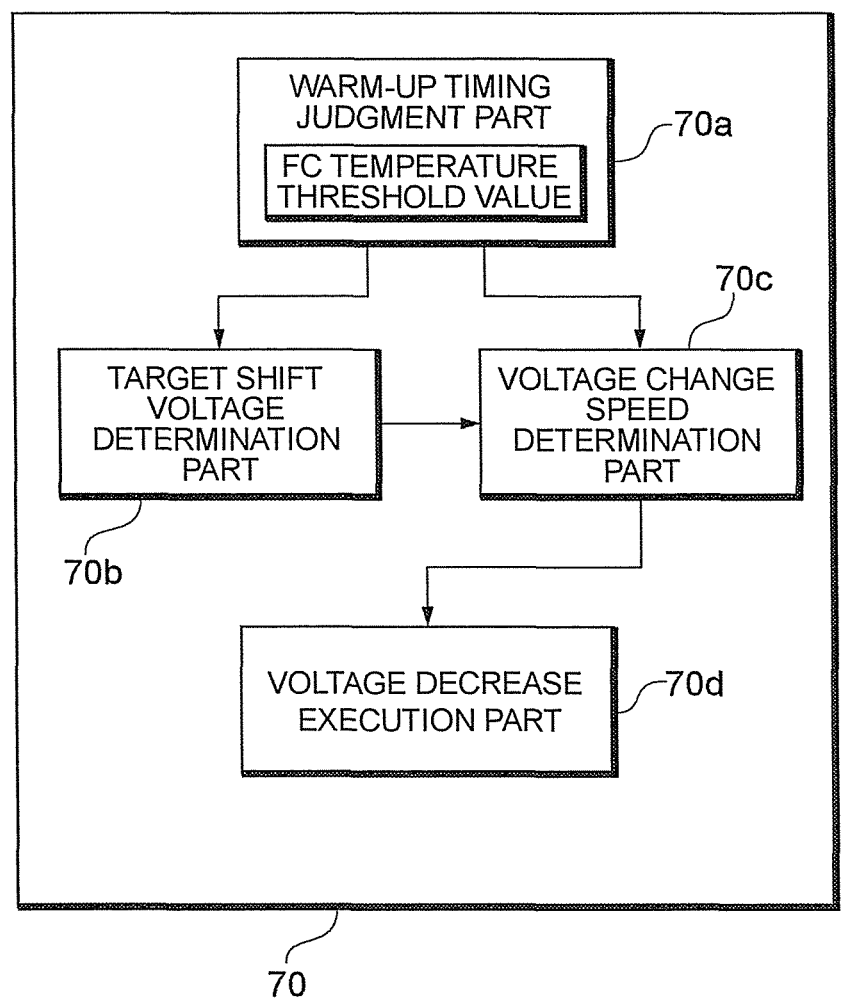
FIG. 4 is a functional block diagram of a controller which carries out warm-up control processing.
Figure 5:
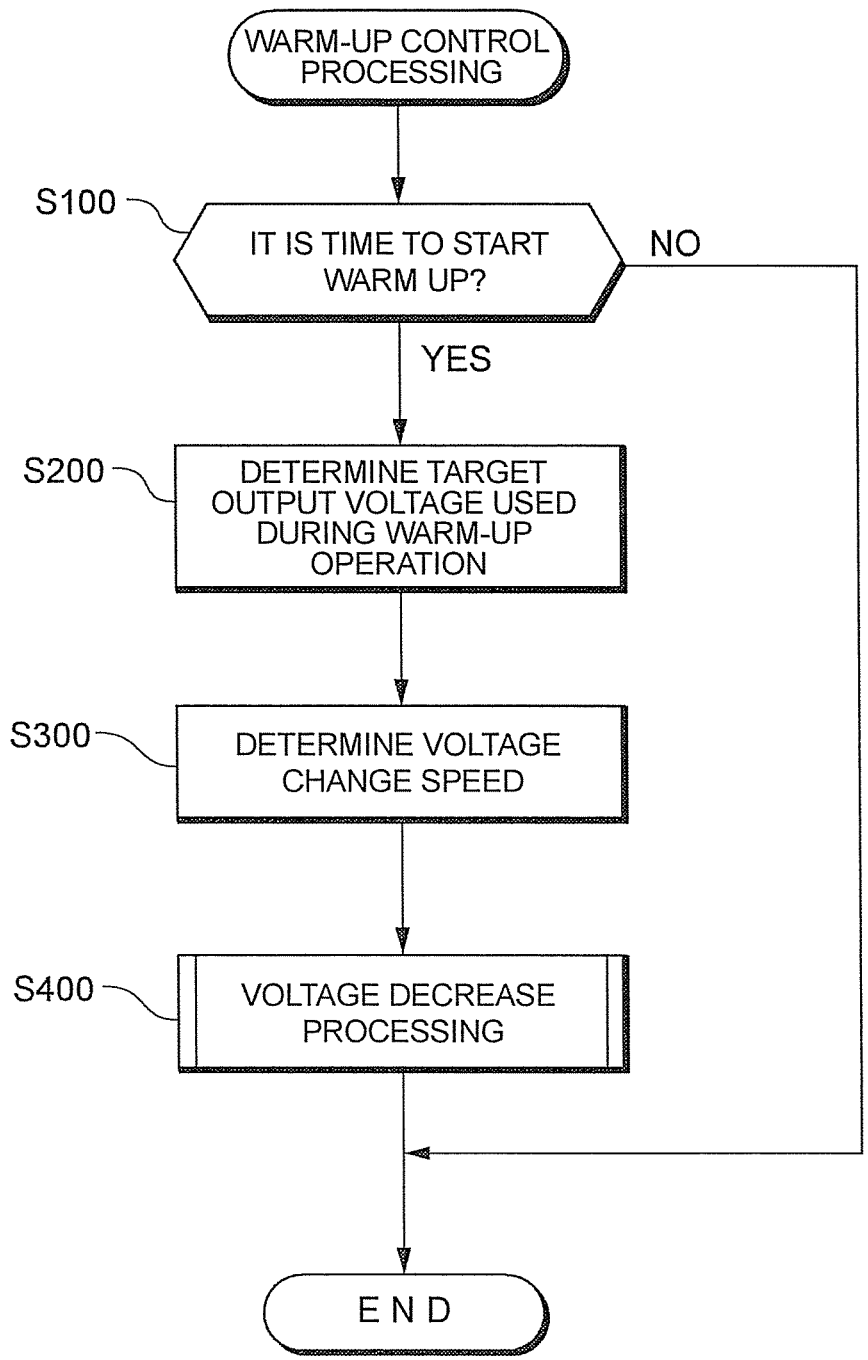
FIG. 5 is a flowchart showing the warm-up control processing.
Figure 6:
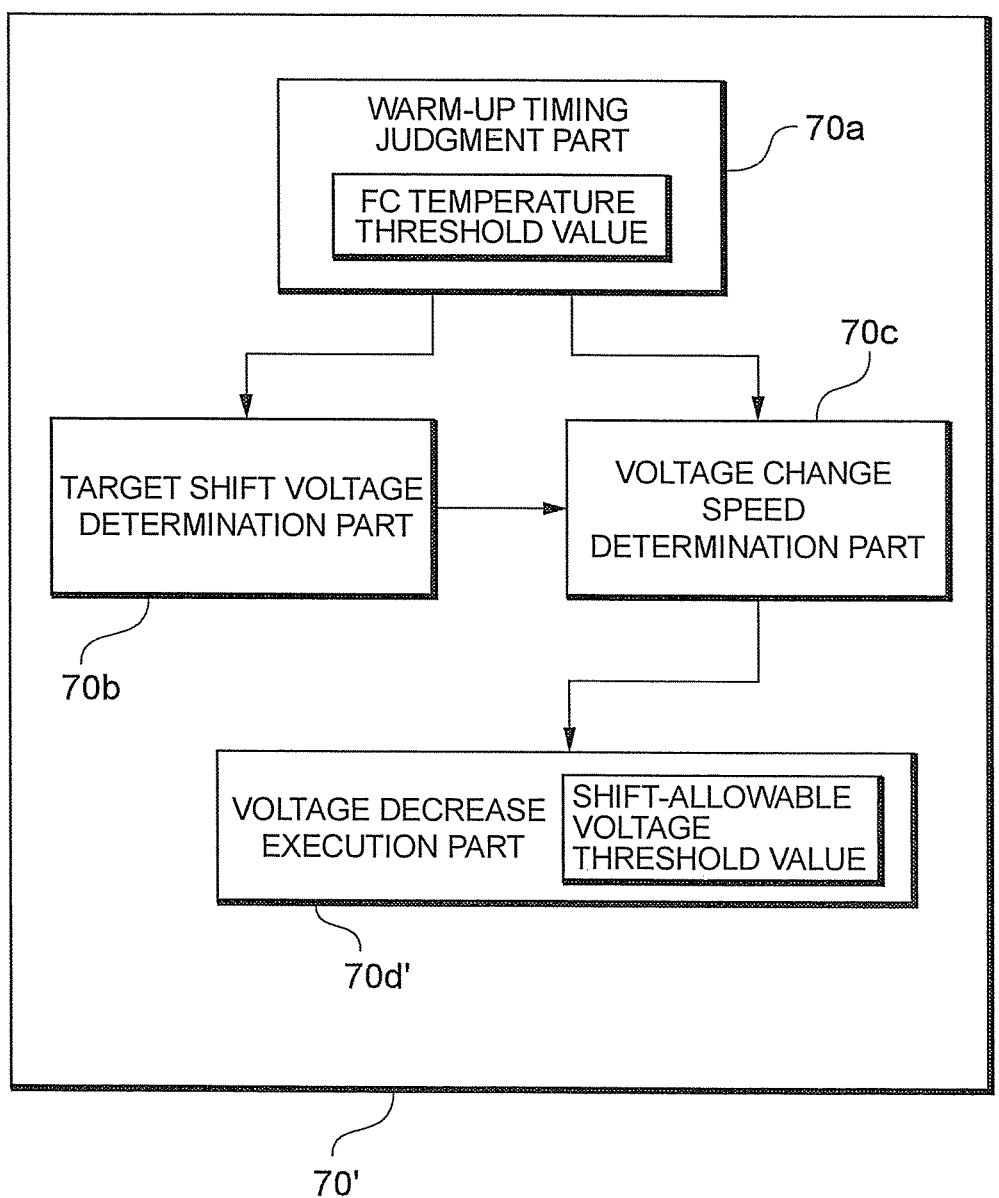
FIG. 6 is a functional block diagram of a controller according to a second embodiment.
Figure 7:
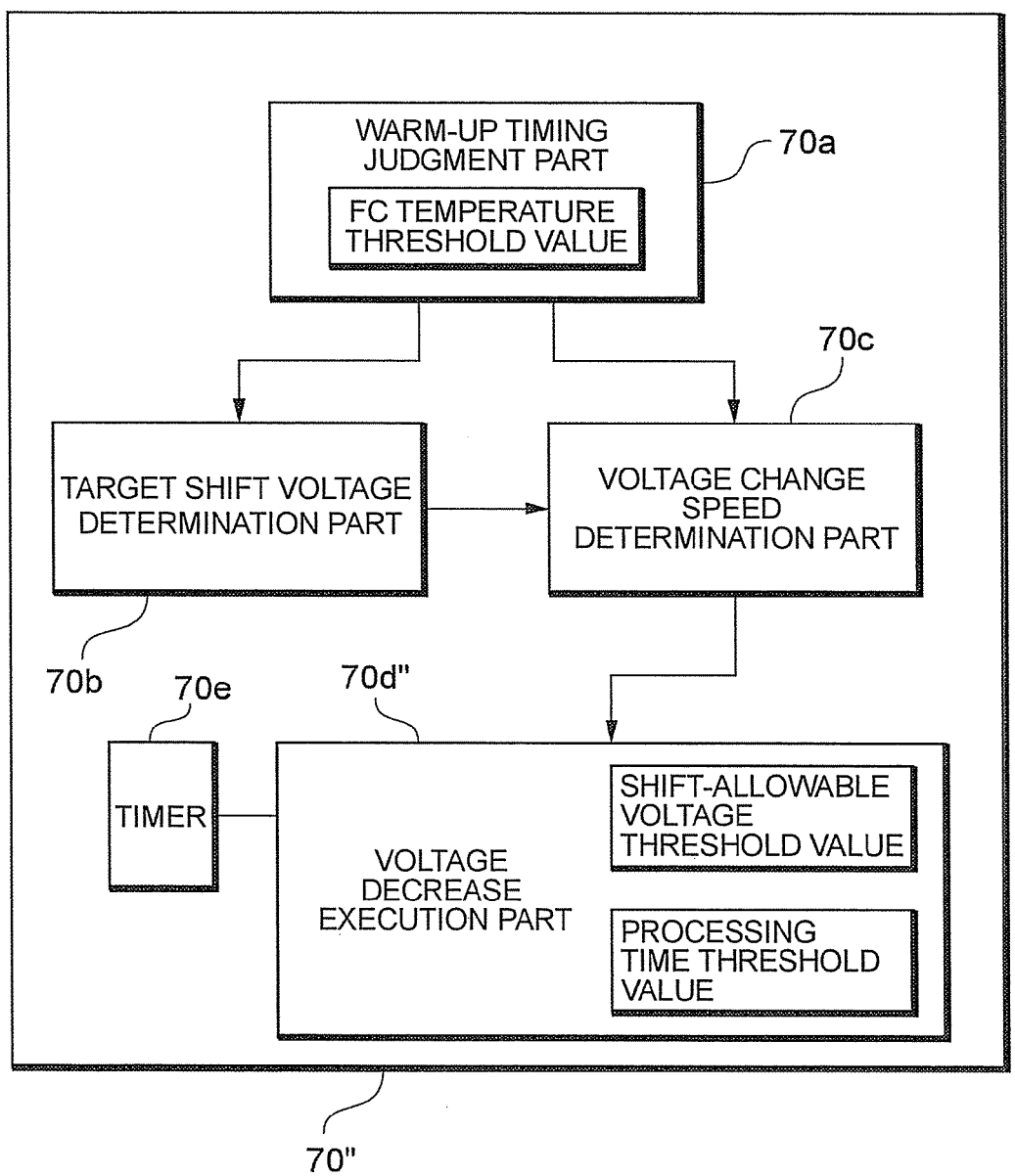
FIG. 7 is a functional block diagram of a controller according to a third embodiment.

10: fuel cell system, 20: fuel cell stack, 30: oxidant gas supply system, 40: fuel gas supply system, 50: power system, 60: cooling system, 70, 70', 70": controller, 70a: warm-up timing judgment part, 70b: target shift voltage determination part, 70c: voltage change speed determination part, 70d, 70d', 70d" voltage decrease execution part, 70e: timer

What is claimed is:

1. A fuel cell system for warming which warms up a fuel cell by carrying out a low-efficiency operation with a power generation efficiency lower than that of a normal operation, the fuel cell system comprising:
 a controller including a computer system having a CPU, a ROM, a RAM, and input faces,
 the controller programmed to:
  judge whether or not it is time to start warm-up of the fuel cell;
  set a target warm-up voltage of the fuel cell with a setting unit;
  detect a current output voltage of the fuel cell with a detection unit; and
  when it is determined that it is time to start the fuel cell and the output voltage is to be decreased to the target-warm-up voltage, determine a voltage change speed of the output voltage based on:
   required electric power,
   the detected output voltage and
   the target warm-up voltage with a determination unit; and
 wherein the controller is further programmed to control a DC/DC converter to decrease the output voltage to the target warm-up voltage at the determined voltage change speed so that the required electric power can be obtained.

2. The fuel cell system according to claim 1, further comprising a temperature detection unit which detects a fuel cell related temperature,
 wherein the judgment unit determines whether or not it is time to start the warm-up of the fuel cell based on the related temperature.

3. The fuel cell system according to claim 2, wherein the setting unit changes the target warm-up voltage in accordance with at least the related temperature, a required amount of heat generation or the required electric power.

4. The fuel cell system according to claim 1, wherein:
 the detection unit detects current output voltages more than once at arbitrary points in time until the output voltage is shifted to the target warm-up voltage; and
 the determination unit determines the voltage change speed of the output voltage based on electric power required from the system, the detected output voltage and the target warm-up voltage every time a detection occurs.

5. The fuel cell system according to claim 1, further comprising a threshold value setting unit which sets a voltage threshold value larger than the target warm-up voltage,
 wherein the controller shifts, when the output voltage falls below the voltage threshold value, the output voltage to the target warm-up voltage at a voltage speed higher than the voltage change speed at the point in time when the output voltage falls below the voltage threshold value.

6. The fuel cell system according to claim 5, further comprising a count unit which counts time elapsed from when the shift of the output voltage is started,
 wherein the determination unit shifts, when the output voltage falls below the voltage threshold value and the elapsed time exceeds a time threshold value, the output voltage to the target warm-up voltage at a voltage change speed higher than the voltage change speed at the point in time when the output voltage falls below the voltage threshold value and the elapsed time exceeds a time threshold value.

7. The fuel cell system according to claim 1, wherein:
 the fuel cell has a circuit structure in which an ideal fuel cell and a capacitor are connected in parallel; and
 the determination unit determines a voltage change speed of the output voltage by taking into account a capacitance component of the capacitor in the fuel cell.

* * * * *